(12) United States Patent
Robertson et al.

(10) Patent No.: US 11,962,696 B2
(45) Date of Patent: Apr. 16, 2024

(54) ENCRYPTION KEY REMOVAL TOOL

(71) Applicant: VMware LLC, Palo Alto, CA (US)

(72) Inventors: Keith Robertson, Palo Alto, CA (US); Sagar Date, Atlanta, GA (US)

(73) Assignee: VMware, Inc., Palo Alto, CA (US)

( * ) Notice: Subject to any disclaimer, the term of this patent is extended or adjusted under 35 U.S.C. 154(b) by 283 days.

(21) Appl. No.: 17/494,345

(22) Filed: Oct. 5, 2021

(65) Prior Publication Data
US 2023/0106183 A1 Apr. 6, 2023

(51) Int. Cl.
*H04L 9/08* (2006.01)
*H04L 9/32* (2006.01)
*H04L 67/1097* (2022.01)

(52) U.S. Cl.
CPC .......... *H04L 9/0894* (2013.01); *H04L 9/0858* (2013.01); *H04L 9/0891* (2013.01); *H04L 9/3263* (2013.01); *H04L 9/3297* (2013.01); *H04L 67/1097* (2013.01)

(58) Field of Classification Search
CPC ... H04L 9/0894; H04L 9/0858; H04L 9/0891; H04L 9/3263; H04L 9/3297; H04L 67/1097
See application file for complete search history.

(56) References Cited

U.S. PATENT DOCUMENTS

| 8,964,973 | B2* | 2/2015 | Chong | G06F 21/57 380/44 |
| 9,389,993 | B1* | 7/2016 | Okmyanskiy | G06F 12/00 |
| 10,855,767 | B1* | 12/2020 | Froh | G06F 7/08 |
| 2006/0062392 | A1* | 3/2006 | Lee | H04L 9/0852 380/278 |
| 2019/0026117 | A1* | 1/2019 | De Atley | H04W 12/04 |

FOREIGN PATENT DOCUMENTS

RU  2491623 C1 * 8/2013

* cited by examiner

*Primary Examiner* — Mohammed Waliullah
(74) *Attorney, Agent, or Firm* — King Intellectual Asset Management

(57) ABSTRACT

Systems and methods are described for removing unused encryption key files from a computing device. In an example, a key removal tool can identify three sets of keys to preserve. For the first set, the key removal tool can append a device identifier to known key names and add the resulting key file names to a whitelist. For the second set, the key removal tool can identify keys associated with certificates on the computing device and add their corresponding file names to the whitelist. The third set can correspond to keys created after a cutoff timestamp. The key removal tool can delete all key files with key file names not on the whitelist that were created before the cutoff timestamp.

20 Claims, 5 Drawing Sheets

ENCRYPTION KEY REMOVAL TOOL

BACKGROUND

Server systems running WINDOWS operating systems ("OS") tend to accumulate small files containing private keys that are not automatically deleted when unused. Even though individual files can be only 3 kilobytes (kB), many such files can accumulate on a server. After applications run for some time, well-known MachineKeys folders end up with millions of key files, which significantly slows the server's access to these folders and consumes large portions of the server's disk space.

While most of the key files are unused and unusable, some are currently in use or potentially required later. Removing all the keys can therefore be harmful to a server and cause system-critical applications to stop functioning. It is difficult to determine whether a given key file is in use or not, and removing key files in use can cause catastrophic malfunctions on the server system.

As a result, a need exists for accurately identifying and safely removing unused encryption keys from a computing device.

SUMMARY

Examples described herein include systems and methods for removing unused encryption keys (hereinafter referred to interchangeably as "encryption keys" or just "keys") from a computing device. Example methods described herein can be implemented by a key removal tool executing in a command line shell. The command line shell can be an interface with a scripting language that allows users to run scripts for task automation and perform configuration management on the computing device, such as POWERSHELL. The key removal tool can be a set of scripts executable in the command line shell that removes keys from the computing device based on a set of parameters. The key removal tool can also be part of an application that executes on the computing device.

In an example, the key removal tool can safely remove keys by first identifying keys that should be preserved and only removing non-identified keys. The identified keys can be added to a whitelist. In one example, the key removal tool can identify keys to be whitelisted using three separate processes. The key removal tool can add a set of keys to the whitelist during each process. Keys that are not added to the whitelist can then be removed.

In an example of the first process, the key removal tool can include a config file with a list of known key names. For example, the file names of keys can be structured using a naming convention that includes a key name and a unique identifier associated with the computing device, such as a Universally Unique Identifier ("UUID"). The known key names in the config files can include well-known key names and any key names manually added by a user. The key removal tool can append the computing device's UUID to each of the key names to create a first set of key file names. The key removal tool can then add the first set of key file names to the whitelist.

In an example of the second process, the key removal tool can identify keys associated with certificates on the computing device. For example, the key removal tool can walk through all the certificate stores on the computing device looking for certificates associated with a key. This can include identifying private keys associated with a public key that a certificate verifies. The key removal tool can create a second set of key file names that includes all the keys associated with certificates and add the second set of key file names to the whitelist.

Errors can occur while scanning the certificate stores. For example, an error can occur when the key removal tool is unable to read a certificate store. In such an instance, the key removal tool can compare the error to a list of known errors in the config file to determine whether it is safe to proceed with the key removal process. If the error is unknown or is known to potentially be harmful to the computing device, the key removal tool can be configured to stop operating and display an error message.

In an example of the third process, the key removal tool can preserve keys created after a certain event or point in time. For example, the key removal tool can compare each keys creation timestamp to a cutoff timestamp. All keys created after the cutoff timestamp can be preserved irrespective of their name being on the whitelist. In one example, a user can designate a cutoff timestamp using the command line shell or other graphical user interface. For example, the key removal tool can allow the user to specify a time or age of keys to preserve. As an example, the user can choose to preserve all keys created in the last two hours. This can be useful where the key removal tool is being used to clean out unused keys on a long-running server. The user can, as an example, restart an application running on the server and configure the key removal tool to remove non-whitelisted keys created before the time that the application was restarted. In an example where the user does not designate a cutoff timestamp, the key removal tool can use a default timestamp, such as the last boot of the computing device. For example, the key removal tool can allow the user to specify a time or age of keys to preserve. As an example, the user can choose to preserve all keys created in the last two hours. This can be useful where the key removal tool is being used to clean out unused keys on a long-running server. The user can, as an example, restart an application running on the server and configure the key removal tool to remove non-whitelisted keys created before the time that the application was restarted.

In one example, the key removal tool can implement the third process can occur while the key removal tool walks through the folder deleting keys. For example, the key removal tool can walk, or crawl, through one or more folders comparing the name of each key to the whitelist and comparing the creation timestamp of each key to the cutoff timestamp. If a key file is on the whitelist or was created after the cutoff timestamp, then the key removal tool can skip the key file. However, if a key file is not whitelisted and was created before the cutoff timestamp, then the key removal tool can delete the key file. In one example, the user can specify one or more folders when executing the key removal tool. In such an example, only keys in the specified folders are removed.

In an example, the key removal tool can include options that allow a user to modify how the key removal tool operates. In one example described above, the user can specify a time or event so that keys created after the time or event are whitelisted. In another example, the user can elect not to preserve any keys based on age. In yet another example, the key removal tool can allow the user to back up the deleted keys to a specified folder. In still another example, the key removal tool can allow the user to ignore all errors.

The examples summarized above can each be incorporated into a non-transitory, computer-readable medium having instructions that, when executed by a processor associated with a computing device, cause the processor to perform the stages described. Additionally, the example methods summarized above can each be implemented in a system including, for example, a memory storage and a computing device having a processor that executes instructions to carry out the stages described.

Both the foregoing general description and the following detailed description are exemplary and explanatory only and are not restrictive of the examples, as claimed.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

Systems and methods are described herein for removing unused encryption key files from a computing device. In an example, a key removal tool can identify three sets of keys to preserve. For the first set, the key removal tool can append a device identifier to known key names and add the resulting key file names to a whitelist. For the second set, the key removal tool can identify keys associated with certificates on the computing device and add their corresponding file names to the whitelist. The third set can correspond to keys created after a cutoff timestamp. The key removal tool can delete all key files with key file names not on the whitelist that were created before the cutoff timestamp.

Figure 1:
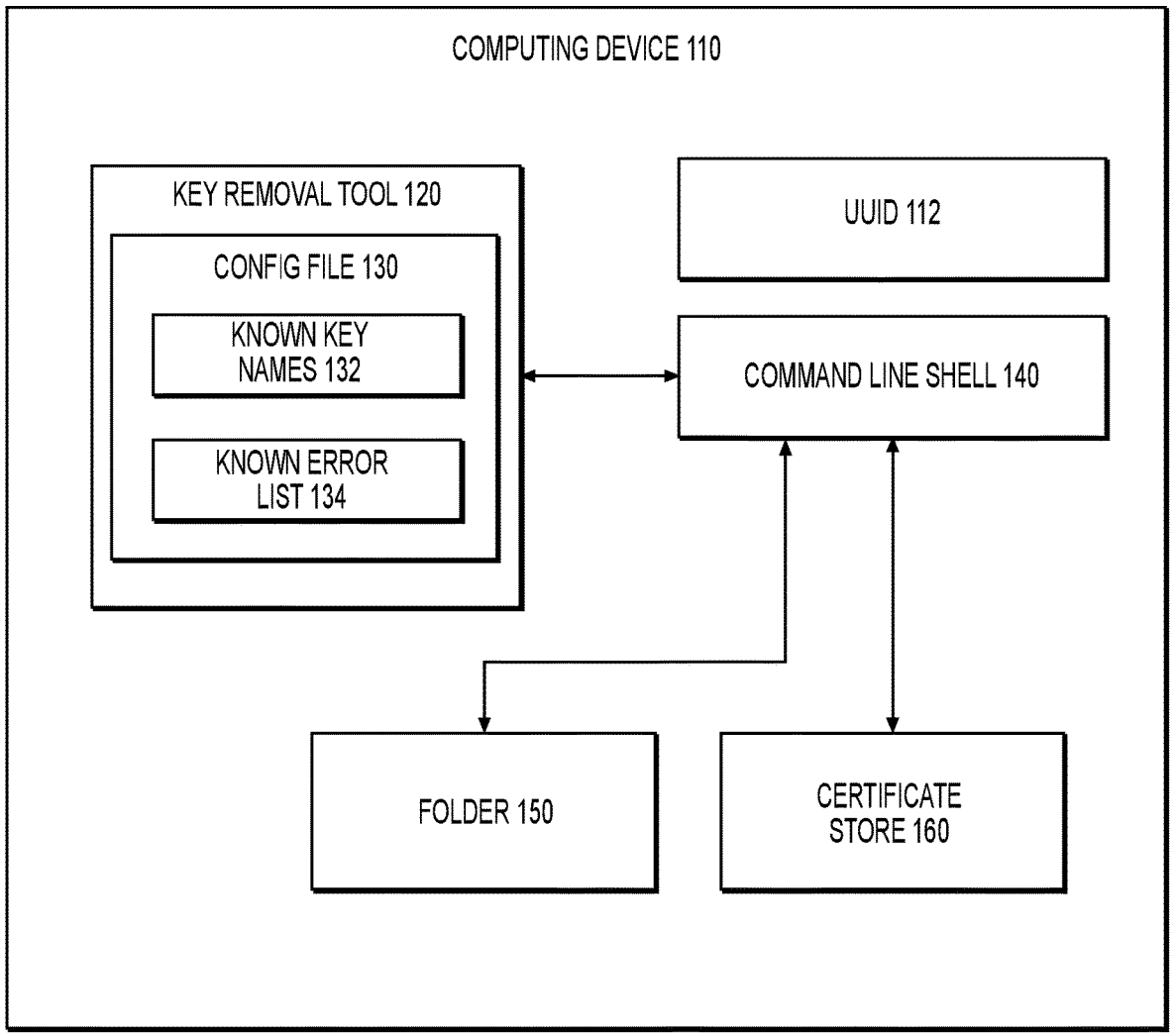
FIG. 1 is an illustration of an example system for removing unused encryption key files from a computing device.

FIG. 1 is an illustration of a system for removing unused encryption key files from a computing device 110. The computing device 110 can be one or more processor-based devices that can store and use encryption keys, such as a server, personal computer, tablet, or cell phone. Encryption keys can be pieces of information, such as alphanumeric characters, that can encode or decode data when processed through a cryptographic algorithm. In one example, the encryption keys can be private encryption keys ("private keys") used in an asymmetric cryptography system, such as public key infrastructure ("PKI"). For example, when the computing device 110 and another device want to securely exchange communications, each of the two devices can create a private-public encryption key pair. The devices can exchange the public encryption keys ("public keys") and store the private keys. Communications can be encrypted with the public keys using a one-way encryption algorithm that makes it so that the corresponding private key is the only encryption key can decrypt the communication. In one example, the computing device 110 can store the private keys in one or more folders 150.

In an example, the computing device 110 can store digital certificates in certificate stores 160. A digital certificate can be a file that verifies the identity of the computing device 110 in a transaction with another device. Some digital certificates can be tied to public keys created by the computing device 110. For example, when the computing device 110 creates a private-public key pair, the computing device 110 can also create a digital certificate that proves that the computing device 110 is the owner of a public key.

In an example, the computing device 110 can include a command line shell 140. The command line shell 140 can include an interface with a scripting language that allows users to run scripts for task automation and perform configuration management on the computing device 110. In one example, the command line shell 140 can be POWERSHELL In an example, the computing device 110 can include a key removal tool 120. The key removal tool 120 can be a set of scripts executable in the command line shell 140 that removes private keys from the computing device 110 based on a set of parameters. The parameters can help identify private keys that are no longer in use. Examples of such parameters are described in detail later herein. The key removal tool 120 can include a configuration ("config") file 130 that the key removal tool 120 can use to identify which private keys are no longer in use. The config file 130 can include known key names 132 and a known error list 134. The key removal tool 120 can append a UUID 112 associated with the computing device 110 to the known key names 132 to create one set of whitelisted file names. In an example, the UUID 112 can be a set of alphanumeric characters that uniquely identifies the computing device 110. The key removal tool 120 can use the known error list 134 to determine whether it should continue or stop execution when an error occurs. For example, the key removal tool 120 can compare the error value to errors on the known error list 134. If the error is on the known error list 134 and designated as safe, then the key removal tool 120 can continue execution. On the other hand, if the error is not on the known error list 134, or if the error is on the known error list 134 but marked unsafe, then the key removal tool 120 can stop execution. The methods described below illustrate how the key removal tool 120 can identify and remove unused private keys while ignoring private keys that may still be in use by the computing device 110.

For example, the key removal tool 120 can be installed on the computing device 110 so that the command line shell 140 can read and execute the scripts associated with the key removal tool 120. The user can load the command line shell 140 and input a line for executing the key removal tool 120. In one example, the user may be required to load the command line shell 140 in an administrator mode. For example, POWERSHELL in MICROSOFT WINDOWS requires the user to select "Run as Administrator" when launching POWERSHELL for the user to be able to execute external applications.

Some examples described herein reference POWERSHELL and a key removal tool 120 with the name "Clean-MachineKeys." These terms are used merely as examples and are not meant to be limiting in any way. For example, examples that describe a user inputting the command "Clean-MachineKeys" into POWERSHELL can represent a user inputting any command into a command line shell 140 that causes the command line shell 140 to execute the key removal tool 120. The term "execution command" is used throughout to refer to the text a user must input into the command line shell 140 to cause the key removal tool 120 to execute.

In an example, the key removal tool 120 can include various options that a user can choose when executing the key removal tool. The user can activate an option by adding text after the execution command corresponding to the option. The term "command modifier" is used to describe such input. The user can therefore execute the key removal tool 120 by inputting the execution command followed by any command modifiers to execute the key removal tool 120 with the specified options. In one example, the user can a certain tool modifier to view help text that lists the execution options. An example of such a command modifier for help text can be "-h" or "-help." In such an example, the user can view the help text of the key removal tool 120 by inputting "Clean-MachineKeys-h" or "Clean-MachineKeys-help." The following is an example of help text for a key removal tool 120.

```
Usage: Clean-MachineKeys [Options] {key folder}
    This can be Run as Administrator.
    Removes private key files from one or more keys folders, keeping files referenced from
cert stores.
    Files are preserved since last boot to avoid deleting transient keys which might be in
use,
    unless you specify another time, e.g. '-createdbefore 24_hours_ago'. This deletes the
key files
    unless you use '-backup {folder}', in which case they are moved to a new timestamped
folder there.
Options:
    -h | -help     Print this help text.
    -c | -createdbefore (lastboot | now | {NUM}_hours_ago)
            Don't process files created after the specified time. (Default: lastboot)
            Note: {NUM} can be a floating-point number.
            You can specify as seconds, minutes, hours, days, or weeks; singular or plural.
    -b | -backup {folder}
            Back up key files to a timestamped subfolder of the given folder,
            It will contain a file ~ORIGIN.TXT with the folder's path these keys came
from.
    -y | -yes      Don't prompt for confirmations. (Danger! Bypasses warnings!)
            For non-interactive use in scripts and scheduled jobs.
```

The command modifier "-c" or "-createdbefore" shown above represents an example option that preserves key files created after a certain time or event. This can define the cutoff timestamp. The user can specify a time or event adding one of "lastboot," "now," or "{NUM}_hours_ago." The text "lastboot" can preserve keys created since the computing device 110 last booted, "{NUM}_hours_ago" can preserve keys created a number of hours specified by {NUM} before the key removal tool 120 executes, and the text "now" can make it so that no time-based protections are created for key files. In one example, where this command modifier is not used, the key removal tool 120 can be configured to default to one of the options. For example, the key removal tool 120 can default to preserving keys created since the most recent boot.

The command modifier "-b" or "-backup" followed by {folder} shown above represents an example option that backs up removed key files to a specified folder, {folder}. The key removal tool 120 can add a file to the backup folder that identifies the path of the folder 150 that the keys were removed from so that the keys can be restored if needed. For example, if a used key is incidentally removed, the application or process that uses that key can fail. The backup folder can allow the user to restore a key file to its original folder 150 in such an instance.

The command modifier "-y" or "-yes" shown above represents an example option that does not prompt the user for confirmations. For example, as will be described later herein, the key removal tool 120 can encounter errors while executing. The key removal tool 120 can be configured to automatically ignore known errors but prompt the user before proceeding after encountering an unknown error or an error known to potentially cause malfunctions if the key removal tool 120 finishes executing. The "-y" or "-yes" command modifier can be useful when the key removal tool 120 is run as a scheduled job and may not be actively monitored by a user.

The key removal tool 120 can also be configured using a graphical user interface in an example. The interface can allow the user to make selections that are used to build a script with features such as those described above. The script can then execute in the command line shell 140.

In an example, the user can specify a folder 150 to clean. For example, as shown in the example help text above, the user can input a folder path into {key folder} after the command modifiers. The {key folder} can indicate the folder 150 that the key removal tool 120 should analyze and clean. In one example, the key removal tool 120 can require that the user specify a folder 150. This can help prevent the key removal tool 120 from needlessly analyzing all the folders and files on the computing device 110, which would waste time and computing resources. In another example, the user can input multiple folder paths for the key removal tool 120 to clean. The example below illustrates an execution command that can cause the key removal tool 120 to clean the keys in four folders 150:

```
Clean-MachineKeys C:\ProgramData\Microsoft\Crypto\RSA
MachineKeys
C:\ProgramData\Microsoft\Crypto\RSA\S-l-5-18
C:\Windows\ServiceProfiles\LocalService\AppData\Roaming\
Microsoft\Crypto\RSA\S-1-5-19
C:\Windows\ServiceProfiles\NetworkService\AppData\Roaming\
Microsoft\Crypto\RSA\S-1-5-20
```

In the example execution command above, the command line shell 140 can recognize the text "Clean-MachineKeys" for executing the key removal tool 120. The key removal tool 120 can recognize "C:\ProgramData\Microsoft\Crypto\RSA\MachineKeys," "C:\ProgramData\Microsoft\Crypto\RSA\S-1-5-18," "C:\Windows\ServiceProfiles\LocalService\AppData\

Roaming\Microsoft\Crypto\RSA\S-1-5-19," and "C:\Windows\ServiceProfiles\NetworkService\AppData\Roaming\Microsoft\Crypto\RSA\S-1-5-20" as the folders 150 for cleaning.

Figure 2:
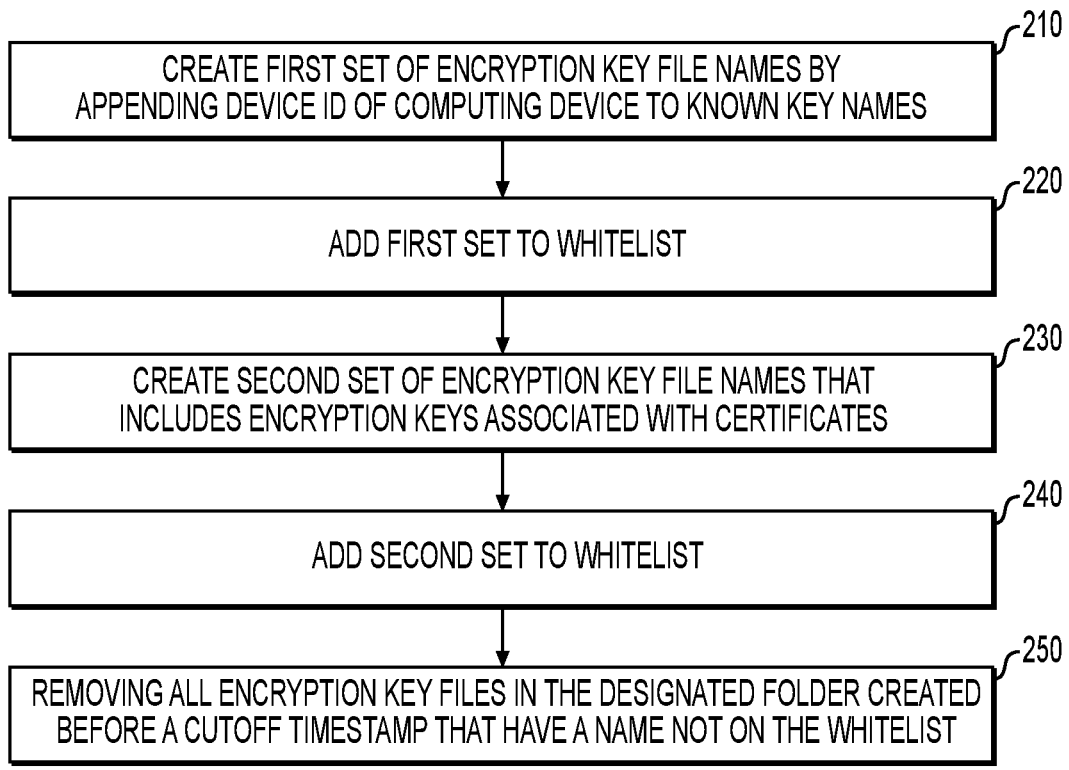
FIG. 2 is a flowchart of an example method for removing unused encryption key files from a computing device.

FIG. 2 is a flowchart of an example method for removing unused encryption key files from the computing device 110. In an example, the example method described below can occur as a result of a user inputting the execution command with any accompanying command modifiers in the command line shell 140.

At stage 210, the key removal tool 120 can create a first set of encryption key file names by appending the UUID 112 to known key names 132. The known key names 132 can be based on keys that are known to cause malfunctions if removed. In an example, these known key names 132 can include key names of keys associated with various key components of the computing device's 110 OS, such as MICROSOFT Message Queuing ("MSMQ"), Internet Information Services ("IIS"), .NET Framework, and so on.

In an example, key removal tool 120 can retrieve the known key names 132 from the config file 130. The key removal tool 120 can append the UUID 112 to the known key names 132 using the naming convention for keys on the computing device 110. As an example, where the naming convention is{key_name}_{UUID}, the key removal tool can add an underscore after each known key name 132 and then add the UUID 112.

At stage 220, the key removal tool 120 can add the first set of encryption key file names to a whitelist. The whitelist can be a list of key file names that the key removal tool 120 is configured to ignore when removing key files.

At stage 230, the key removal tool 120 can create a second set of encryption key file names that includes encryption keys associated with certificates on the computing device 110. For example, the key removal tool 120 can walk through all the certificate stores 160 on the computing device 110 looking for certificates associated with a key. This can include identifying private keys associated with a public key that a certificate verifies. At stage 240, the key removal tool 120 can add the second set of encryption key file names to the whitelist.

At stage 250, the key removal tool 120 can remove all encryption key files in the folder 150 that were created before a cutoff timestamp and have a name not on the whitelist. The key removal tool 120 can preserve non-whitelisted key files that were created after the cutoff timestamp. For example, key removal tool 120 can crawl through each key file in the folder or folders 150 comparing each key file name to the whitelist and comparing each key file's creation date to a cutoff timestamp. If a key file name matches or the key file was created before the cutoff timestamp, then the key removal tool 120 can ignore the key file. Otherwise, the key removal tool 120 can delete the key file.

In an example, key removal tool 120 can be configured to use default timestamp if the execution command does not include a command modifier identifying a custom timestamp. In one example, the default cutoff timestamp for the key removal tool 120 can correspond to the last time the computing device 110 booted. For example, the key removal tool 120 can check event logs of the computing device 110 and retrieve a timestamp of the event log corresponding to the latest boot. Some applications and system processes create new keys when starting up. Removing keys created before the last boot and preserving those created after the last boot can preserve keys that may be in use by these system processes while removing old keys that those processes and applications are no longer using. The key removal tool 120 can also be configured with other default timestamps, such as a week ago or a month ago. The key removal tool 120 can use the default cutoff timestamp whenever the user does not provide a custom timestamp.

In an example, a user can specify a custom timestamp that overrides the default timestamp. For example, the user can use a command modifier, such as the "-createdbefore" command modifier described previously, to specify a time threshold for key removal. This can be particularly useful when the user is cleaning out unused key files on a long-running server. For example, if a server has been running for weeks or months, keeping key files since the last boot may preserve many unused keys, thereby reducing or nullifying the advantages of removing unused key files. The user can use the command modifier to specify which keys will be preserved based on their creation date. For example, the user can preserve keys created in the last 2 hours or 3 days. As an example, the computing device 110 can be a server that hosts an application, and the keys associated with the application need to be preserved. The user can determine when the application last restarted and preserve any keys created after the last application restart time.

In one example, the user can use the command modifier to not preserve any keys based on age. This would cause the key removal tool 120 to remove all non-whitelisted keys. Using the example above regarding a server hosting an application, the user can run the key removal tool 120 and then restart the application on the server. This can help ensure that the maximum number of unused keys are removed.

In some examples, the key removal tool 120 can be scheduled to run before or after the computing device 110 reboots or an application on the computing device 110 restarts. Timing the key removal tool 120 to execute just before a reboot or application restart can reduce the number of unused keys left on the computing device 110. In one example, the key removal tool 120 can be scheduled to run at a certain time, such as overnight or during a scheduled maintenance, and the application can be scheduled to restart after the key removal tool 120 finishes. In another example, the application can be scheduled to restart first, and the key removal tool 120 can be scheduled to run afterward and to set the application restart time as the threshold for the cutoff timestamp. In yet another example, the key removal tool 120 can be scheduled to run without a time threshold, and the computing device 110 can be scheduled to restart afterward.

Figure 3:
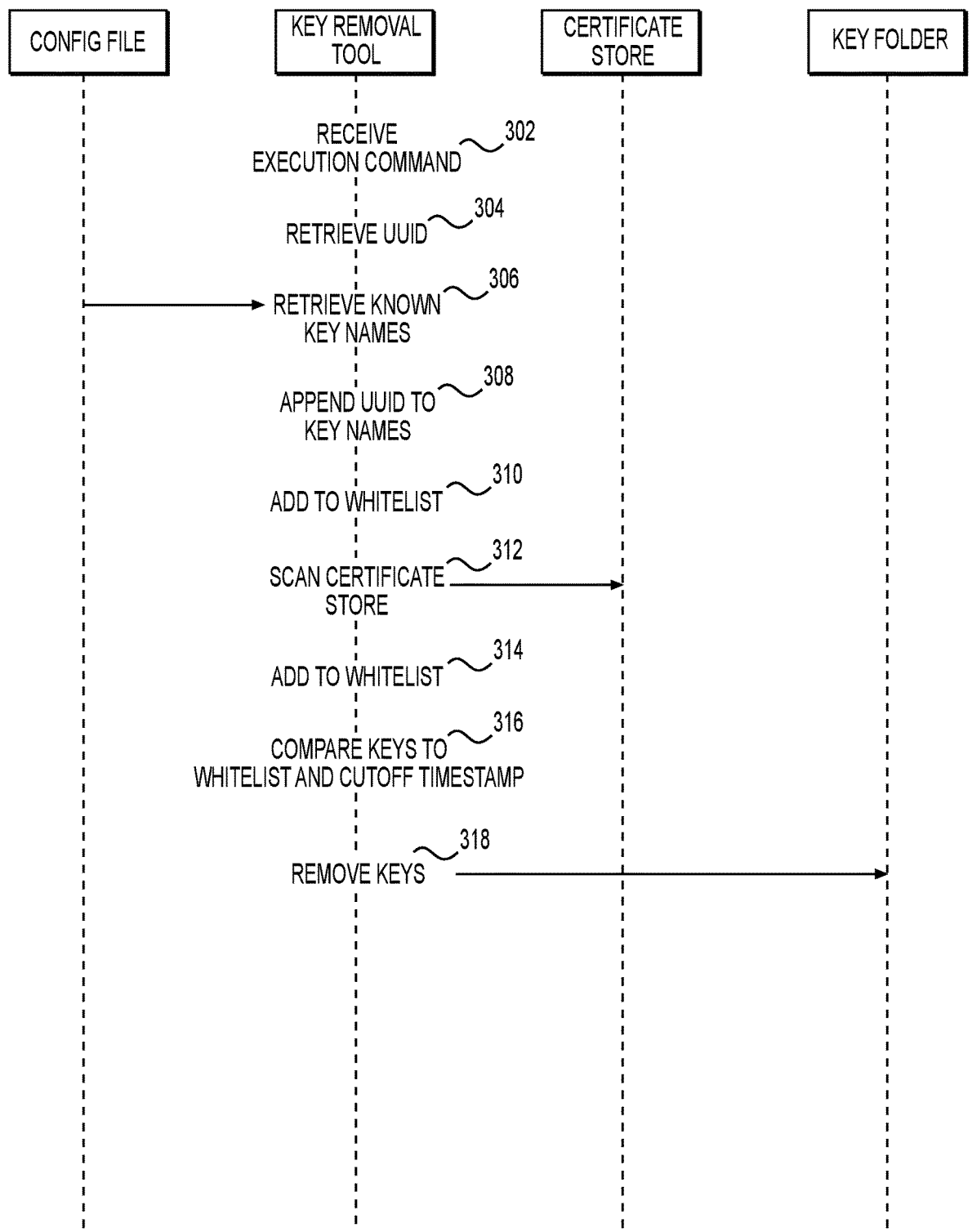
FIG. 3 is another sequence diagram of an example method for removing unused encryption key files from a computing device.

FIG. 3 is another sequence diagram of an example method for removing unused encryption key files from the computing device 110. At stage 302, the key removal tool 120 can receive a command to execute. For example, a user can enter the execution command for the key removal tool 120 into the command line shell 140. The command line shell 140 can load the key removal tool 120 so that the key removal tool 120 begins executing. In one example, the execution command can specify one or more folders 150 on the computing device 110 that contain keys. This can cause the key removal tool 120 to clean unused keys only from the specified folders 150.

At stage 304, the key removal tool 120 can identify the UUID 112. For example, the UUID 112 can be stored in a known location on the computing device 110 and the key removal tool 120 can retrieve the UUID 112 from that location. In one example, the key removal tool 120 can query the computing device's 110 OS for the UUID 112.

At stage 306, the key removal tool 120 can retrieve known key names 132 from the config file 130. For example, the config file 130 can include a list of well-known key names 132 that correspond to important services on the computing device 110. Removing keys associated with these services can cause serious malfunctions on the computing device 110, and those keys should therefore not be removed.

At stage 308, the key removal tool 120 can append the UUID 112 to the known key names 132. The key removal tool 120 can append the UUID 112 to the known key names 132 according to the naming convention of the keys. As an example, where the key names 132 are formatted like {key_name}_{UUID}, the key removal tool can add an underscore after each known key name 132 and then add the UUID 112. At stage 310, the key removal tool 120 can add the appended key file names to a whitelist. The whitelist can be a list of key file names that the key removal tool 120 is configured to ignore when removing key files.

At stage 312, the key removal tool 120 can scan the certificate stores 160 to identify encryption keys associated with certificates on the computing device 110. For example, the key removal tool 120 can walk through all the certificate stores 160 on the computing device 110 looking for certificates associated with a private key file. This can include identifying private keys associated with a public key that a certificate verifies. For example, where the key removal tool 120 determines that a certificate is associated with a public key, the key removal tool can identify the private key paired to the public key. At stage 314, the key removal tool 120 can add the key file names of keys associated with certificates to the whitelist.

At stage 316, the key removal tool 120 can compare the key files in the folder 150 to the whitelist and a cutoff timestamp. In an example, the key removal tool 120 can be configured to preserve all keys those keys created after the cutoff timestamp irrespective of their name. In one example, the user can specify the cutoff timestamp by inputting a corresponding command modifier in the execution command. For example, the user can use a command modifier, such as the "-createdbefore" command modifier described previously herein, to specify a time threshold for key removal.

In an example, the user can use the command modifier to specify which keys will be preserved based on their creation date. For example, the user can preserve keys created in the last 2 hours or 3 days. In one example, the user can use the command modifier to not preserve any keys based on age. This would cause the key removal tool 120 to remove all non-whitelisted keys. In one example, when the execution command does not include a user-provided timestamp, the key removal tool 120 can use a default timestamp. In one example, the default cutoff timestamp for the key removal tool 120 can correspond to the last time the computing device 110 booted. For example, the key removal tool 120 can check event logs of the computing device 110 and retrieve a timestamp of the event log corresponding to the latest boot. The key removal tool 120 can also be configured with other default timestamps, such as a week ago or a month ago.

In an example, the key removal tool 120 can crawl through the folder 150 and compare each key file to the whitelist and the cutoff timestamp. If a key file is on the whitelist or was created after the cutoff timestamp, then the key removal tool 120 can skip the key file. However, if the key file is not whitelisted and was created before the cutoff timestamp, then at stage 318 the key removal tool 120 can delete the key file. With this kind of comparison, the key removal tool 120 need only scan the folder 150 a single time, which can avoid wasting resources caused by multiple scans. Such waste can occur if, for example, the key removal tool 120 were to create a third set of key names to add to the whitelist by scanning the folder 150 to identify keys created after the cutoff timestamp before scanning for key removal.

At stage 322, the key removal tool 120 can delete encryption keys with file names not on the whitelist. For example, the key removal tool 120 can compare each key file name in the folder 150 to the whitelist. If a key's file name is not on the whitelist, then the key removal tool 120 can delete the key, and if the key's file name is on the whitelist, then the key removal tool 120 can skip over the key. In one example where the user inputs a command modifier for backing up the key files, the key removal tool 120 can save the removed keys to a backup folder that it creates. The backed up key files can be restored if removing the keys causes the computing device or an application thereon to function incorrectly.

The stages described above regarding FIG. 3 need not occur in the order presented. For example, the stages can be broken into three sets. The first set can include stages 304, 306, 308, and 310 that describe the key removal tool 120 appending the UUID 112 to the known key names 132 and adding the resulting key file names to the whitelist. The second set can include stages 312 and 314 that describe the key removal tool 120 scanning the certificate stores 160 can adding key file names of keys associated with certificates to the whitelist. The third set can include stages 316 and 318 that describe the removal process. The key removal tool 120 can execute the first two sets of stages in any order or concurrently.

Figure 4:
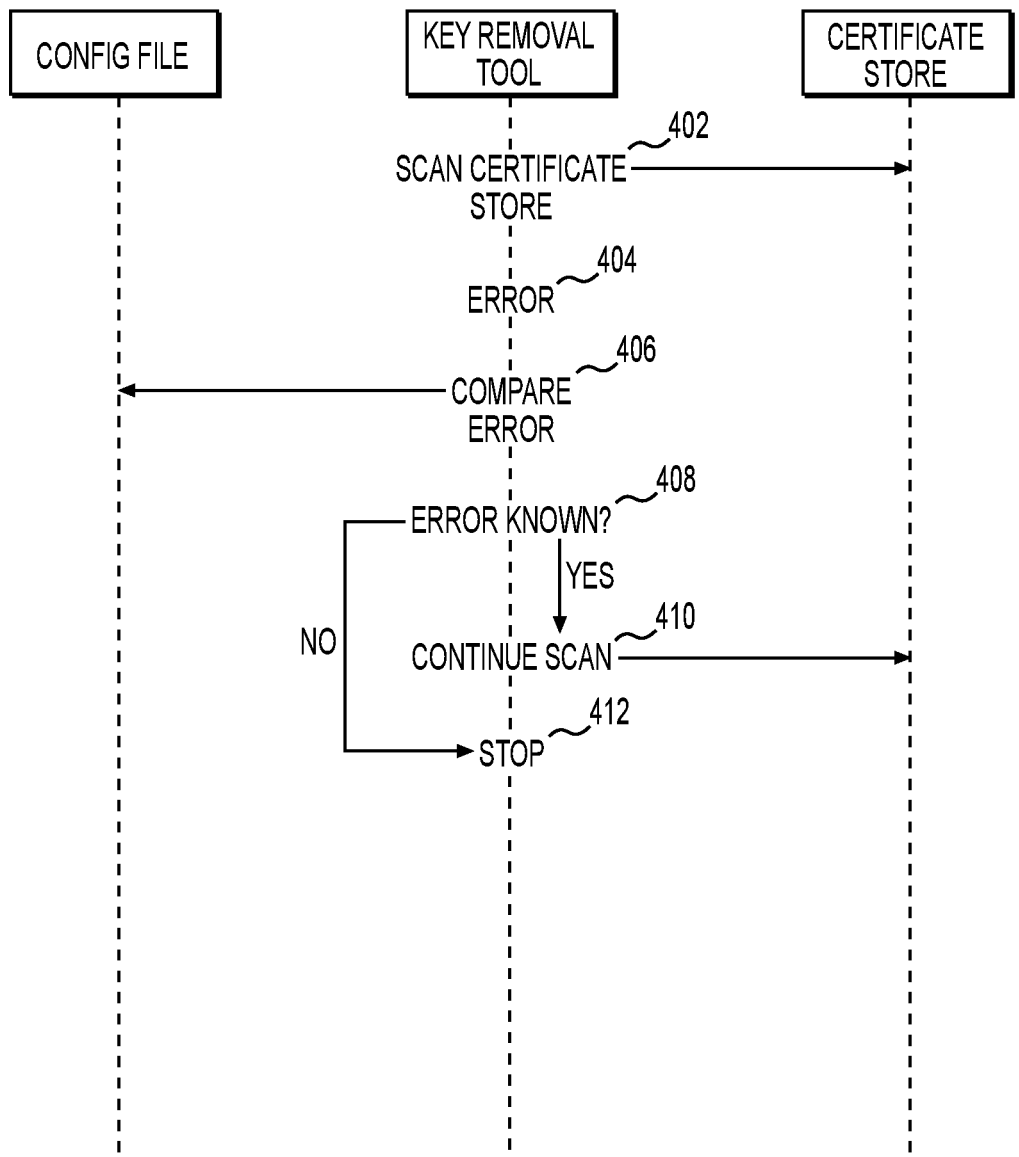
FIG. 4 is a sequence diagram of another example method for removing unused encryption key files from a computing device.

FIG. 4 is a sequence diagram of an example method for handling errors when scanning the certificate store 160 when removing unused encryption key files from the computing device 110. At stage 402, the key removal tool 120 can begin scanning the certificate stores 160 for keys associated with certificates on the computing device 110. For example, the key removal tool 120 can walk through all the certificate stores 160 on the computing device 110 looking for certificates associated with a key.

At stage 404, the key removal tool 120 can detect an error during the scan. For example, an error can occur if the key removal tool 120 is unable to read a certificate store 160 or unable to identify a private key associated with a public key that a certificate verifies. The tool 120 can catch the error and determine whether to continue the scan in view of the error. At stage 406, the key removal tool 120 can compare the error to the known error list 134 in the config file 130. This can include comparing an error identifier against identifiers stored in the known error list 134.

At stage 408, the key removal tool 120 can determine whether the error matches one of the known errors in the known error list 134. The known error list 134 can be configured in one of multiple ways. In one example, the known error list 134 can include only errors deemed acceptable. Acceptable errors can include errors that are not known to cause the key removal tool 120 to remove keys that should not be removed. In this example, only acceptable errors are added to the known error list 134. In another example, the known error list 134 can include all known errors, and the known error list 134 can indicate whether each error is acceptable or unacceptable. Unacceptable errors can include errors that can cause the key removal tool 120 to remove important keys. For example, if an error indicates that the key removal tool 120 cannot read a certificate store 160, then the key removal tool 120 will not be able to determine whether the certificate store 160 has an associated key. If the unreadable container store has an associated key and the key removal tool 120 ignores this error, then the associated key will not be added to the whitelist and subsequently deleted, which can cause serious malfunctions with the computing device 110 or an application installed thereon.

If the error matches a known acceptable error, the method can proceed to stage 410 where the key removal tool 120 can ignore the error and continue scanning the certificate store 160. However, if the error is not known, or is known to be unacceptable, the method can proceed to stage 412 where the key removal tool 120 can stop the key removal process. In one example, the key removal tool 120 can display the error in the command line shell 140 for review by the user. The key removal tool 120 can only prompt the user with options for proceeding. For example, the key removal tool 120 can allow the user to choose whether to terminate the key removal process or ignore the error and continue.

In an example, the key removal tool 120 can provide an option to add the error to the known error list 134. As an example, the key removal tool 120 can encounter an error where it cannot read a particular certificate store 160. The error can identify the type of error (unable to read a certificate store 160) as well as information related to the associated certificate, such as the name and file path. Where the error is not on the known error list 134, the key removal tool 120 can stop executing and display the error type and certificate name in the command line shell 140. The user can locate the certificate manually and determine whether the certificate has an associated key. If so, the user has various options for troubleshooting. As some examples, the user can try to determine why the key removal tool 120 could not read the certificate store 160 and fix the issue, the user can terminate the key removal tool 120 execution until a solution can be found, or the user identify the associated key and add its key name to the known key names 132. If the certificate does not have an associated key, the user can simply add the error to the known error list 134 and the scan can continue. The user can also add the error to the known error list 134 if the certificate has an associated key, but the user determines that it is safe to remove the key. On subsequent executions of the key removal tool 120, the error will be ignored if the user added the error to the known error list 134, and the associated key will be whitelisted if user added the associated key name to the known key names 132.

Figure 5:
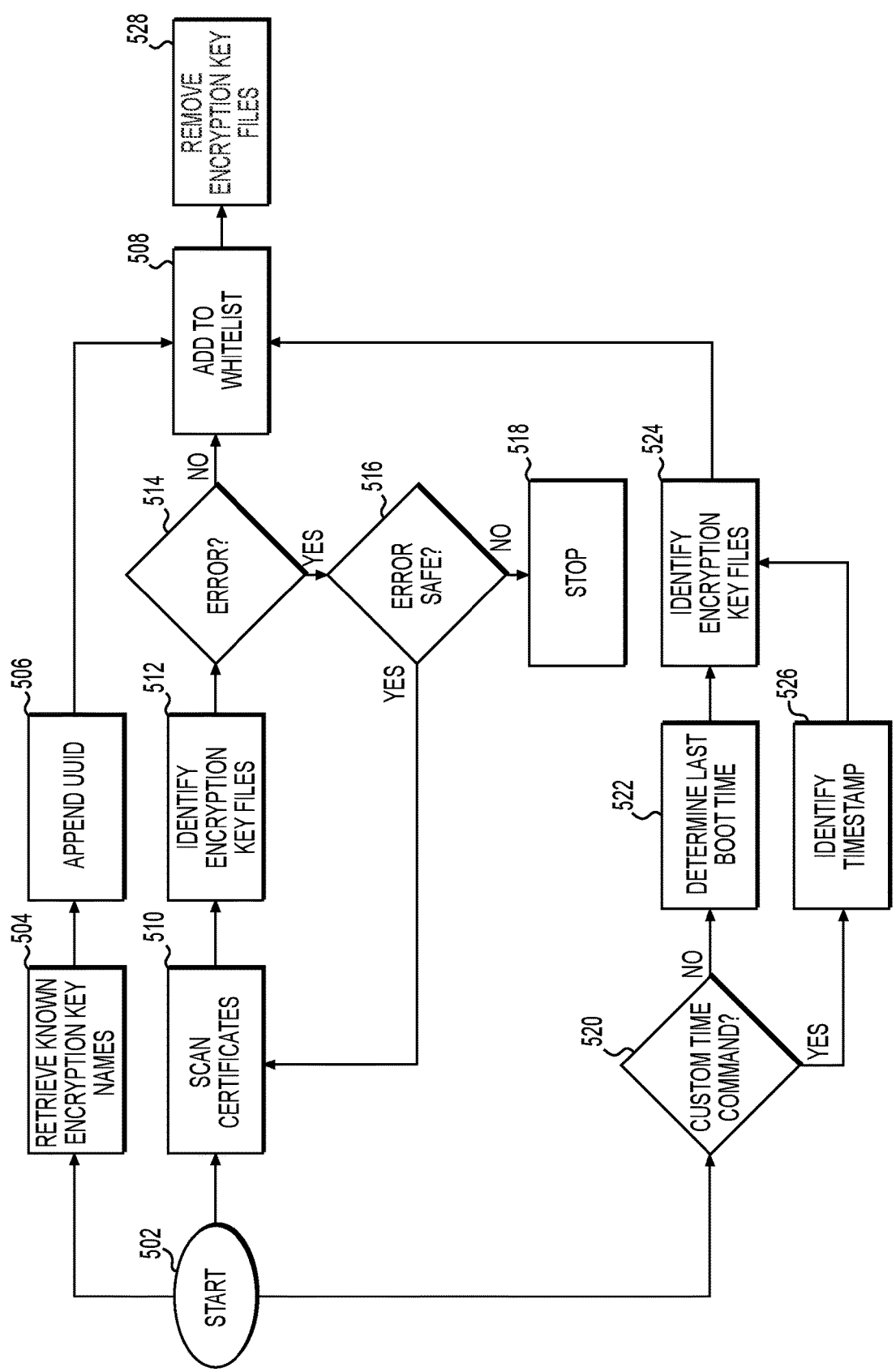
FIG. 5 is a flowchart of another example method for removing unused encryption key files from a computing device.

FIG. 5 is a flowchart of another example method for removing unused encryption key files from a computing device. The example method below describes different paths the key encryption tool 120 can take when analyzing encryption key files. At stage 502, the key removal tool 120 can start. For example, a user can load the command line shell 140 on the computing device 110 and enter the execution command. In one example, the user can specify one or more folder names of folders 150 that the key removal tool 120 will clean. The key removal tool 120 can then proceed perform three different processes of identifying key file names to add to a whitelist. The three processes being at stages 504, 510, and 520. The key removal tool 120 can perform the three processes in any order or simultaneously.

The first process can preserve key files associated with known key names. For the first process, at stage 504, the key removal tool 120 can retrieve known key names 132 from the config file 130. The known key names can include names of well-known keys or names of keys added to the list by the user that should not be removed. At stage 506, the key removal tool 120 can append the UUID 112 to the known key names 132 to create file names for well-known keys. At stage 508, the key removal tool 120 can add the key file names from the first process to a whitelist.

The second process can preserve keys associated with certificates on the computing device 110. The second process can begin at stage 510 where the key removal tool 120 can scan certificate stores 160. For example, the key removal tool 120 can walk through all the certificate stores 160 on the computing device 110 looking for certificates associated with a key. This can include identifying private keys associated with a public key that a certificate verifies. At stage 512, the key removal tool 120 can identify the names of encryption key files associated with certificates in the certificate stores 160.

At stage 514, the method can go in one of two ways, depending on whether an error occurs. For example, if no errors occur during the certificate scan, the method can proceed to stage 508 where the key removal tool 120 can add the key file names identified at stage 512 to the whitelist. If an error does occur, the method can proceed to stage 516 where the key removal tool 120 determines whether the error is safe. For example, the key removal tool 120 can determine whether the error matches one of the known errors in the known error list 134. If the error id determined to be safe, the method can return to stage 510 where the key removal tool 120 can continue scanning certificate stores 160. However, if the error is unknown or known to be unsafe, the key removal tool 120 can cease operations at stage 518. In one example, the key removal tool 120 can display information related to the error in the command line shell 140 and provide options for handling the error that the user can choose from.

The third process can preserve keys created after a certain time or event. The third process can begin at stage 520 where the key removal tool 120 can determine whether the user provided a custom time command. For example, as described previously herein, when inputting the execution command in the command line shell 140 to initiate the key removal tool 120, the user can also input a command modifier that causes the key removal tool 120 to preserve all keys created after a specified time or event. If the user does not input such a command modifier, the method can proceed to stage 522 where the key removal tool 120 executes under the default setting, which in this example is based on when the computing device 110 last booted. For example, the key removal tool 120 can determine a timestamp of the last boot time of the computing device 110 and compare a creation timestamp of each of the key files to the boot timestamp. At stage 524, the key removal tool 120 can identify all key files with a creation timestamp later than the boot timestamp, and the method can then proceed to stage 508 where the key removal tool 120 adds the file names of the identified key files to the whitelist.

If the user does provide a command modifier at stage 520, the method can proceed to stage 526 where the key removal tool 120 can determine a timestamp based on the user input. For example, if the user inputs a command modifier for preserving keys created in the last two hours, the key removal tool 120 can determine a current timestamp and create a timestamp for two hours earlier. The method can then proceed to stage 524 where the key removal tool 120 can identify all key files with a creation timestamp later than the timestamp based on the user input. Then, at stage 508, the key removal tool 120 can add all such key file names to the whitelist.

In one example where the user inputs the "now" command modifier described previously herein, which causes the key removal tool 120 not to preserve any keys based on their creation time, the key removal tool 120 can stop operations in the third process.

Once all three processes are complete, the method can proceed to stage 528 where the key removal tool 120 can remove all non-whitelisted key files. For example, the key removal tool 120 can compare the file name of each key file to the whitelist. If the file name is on the whitelist, the key removal tool 120 can ignore the key file. If the file name is not on the whitelist, the key removal tool 120 can delete it. In an example where the user specifies a folder 150, the key removal tool 120 can whitelist key files only in the specified folder 150, and then only remove non-whitelisted key files in folder 150.

In one example of the method described above, instead of identifying encryption key files created after a timestamp at stage 524, the key removal tool 120 can create a rule based on the timestamp. The rule can instruct the key removal tool 120 to add encryption keys to the whitelist that were created after the timestamp. In such an example, removing the encryption key files at stage 528 can include scanning the key files in the folder 150. The key removal tool 120 can compare each file name to the whitelisted names added from the first and second processes. The key removal tool can also compare the creation timestamp of each key file to the timestamp in the rule. If a key file matches a whitelisted name or has a creation timestamp later than the timestamp identified in the rule, then the key removal tool 120 can ignore the key file. Otherwise, the key removal tool 120 can delete the key file. In this example, the key removal tool 120 only needs to scan the folder 150 a single time, as opposed to scanning the folder 150 multiple times to create whitelists.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A method for removing unused encryption key files from a computing device, comprising:
   creating a first set of encryption key file names by appending a device identifier of the computing device to each of a plurality of known encryption key names;
   adding the encryption key file names in the first set to a whitelist;
   creating a second set of encryption key file names that includes encryption keys associated with certificates on the computing device;
   adding the encryption key files names in the second set to the whitelist;
   comparing, to the whitelist, a name of each encryption key file of a set in a designated folder of the computing device;
   comparing a creation date of each encryption key file in the designated folder to a cutoff timestamp; and
   removing all encryption key files in the designated folder created before the cutoff timestamp have a name not on the whitelist.

2. The method of claim 1, further comprising receiving a command in a command line that includes a custom timestamp, wherein the command causes the computing device to remove encryption key files not on the whitelist that have a creation date earlier than the custom timestamp.

3. The method of claim 1, wherein creating the second set of encryption key file names comprises:
   scanning one or more certificate stores on the computing device;
   identifying certificates on the computing device with an associated encryption key;
   identifying the associated encryption key; and
   adding a file name of the associated encryption key to the whitelist.

4. The method of claim 3, wherein creating the second set of encryption key file names further comprises:
   detecting an error that occurred during the scanning;
   comparing the error to a list of known errors;
   determining, based on the comparing, whether the error is safe; and
   in an instance where the error is determined to be safe, continuing the scanning.

5. The method of claim 4, wherein, in an instance where the error is not determined to be safe, the method further comprises stopping the scanning and not removing any encryption files from the computing device.

6. The method of claim 1, wherein the cutoff timestamp corresponds to the most recent boot of the computing device.

7. The method of claim 1, further comprising backing up the non-whitelisted encryption key files to a predetermined folder.

8. A non-transitory, computer-readable medium containing instructions that are executed by a hardware-based processor to perform stages for removing unused encryption key files from a computing device, the stages comprising:
   creating a first set of encryption key file names by appending a device identifier of the computing device to each of a plurality of known encryption key names;
   adding the encryption key file names in the first set to a whitelist;
   creating a second set of encryption key file names that includes encryption keys associated with certificates on the computing device;
   adding the encryption key files names in the second set to the whitelist;
   comparing a name of each encryption key file in a designated folder of the computing device to the whitelist;
   comparing a creation date of each encryption key file in the designated folder to a cutoff timestamp; and
   removing all encryption key files in the designated folder created before the cutoff timestamp have a name not on the whitelist.

9. The non-transitory, computer-readable medium of claim 8, the stages further comprising receiving a command in a command line that includes a custom timestamp, wherein the command causes the computing device to remove encryption key files not on the whitelist that have a creation date earlier than the custom timestamp.

10. The non-transitory, computer-readable medium of claim 8, wherein creating the second set of encryption key file names comprises:
    scanning one or more certificate stores on the computing device;
    identifying certificates on the computing device with an associated encryption key;
    identifying the associated encryption key; and
    adding a file name of the associated encryption key to the whitelist.

11. The non-transitory, computer-readable medium of claim 10, wherein creating the second set of encryption key file names further comprises:
- detecting an error that occurred during the scanning;
- comparing the error to a list of known errors;
- determining, based on the comparing, whether the error is safe; and
- in an instance where the error is determined to be safe, continuing the scanning.

12. The non-transitory, computer-readable medium of claim 11, wherein the stages further comprise, in an instance where the error is not determined to be safe, stopping the scanning and not removing any encryption files from the computing device.

13. The non-transitory, computer-readable medium of claim 8, wherein the cutoff timestamp corresponds to the most recent boot of the computing device.

14. The non-transitory, computer-readable medium of claim 8, the stages further comprising backing up the non-whitelisted encryption key files to a predetermined folder.

15. A system for removing unused encryption key files from a computing device, comprising:
- a memory storage including a non-transitory, computer-readable medium comprising instructions; and
- a computing device including a hardware-based processor that executes the instructions to carry out stages comprising:
  - creating a first set of encryption key file names by appending a device identifier of the computing device to each of a plurality of known encryption key names;
  - adding the encryption key file names in the first set to a whitelist;
  - creating a second set of encryption key file names that includes encryption keys associated with certificates on the computing device;
  - adding the encryption key files names in the second set to the whitelist;
  - comparing a name of each encryption key file in a designated folder of the computing device to the whitelist;
  - comparing a creation date of each encryption key file in the designated folder to a cutoff timestamp; and
  - removing all encryption key files in the designated folder created before the cutoff timestamp have a name not on the whitelist.

16. The system of claim 15, the stages further comprising receiving a command in a command line that includes a custom timestamp, wherein the command causes the computing device to remove encryption key files not on the whitelist that have a creation date earlier than the custom timestamp.

17. The system of claim 15, wherein creating the second set of encryption key file names comprises:
- scanning one or more certificate stores on the computing device;
- identifying certificates on the computing device with an associated encryption key;
- identifying the associated encryption key; and
- adding a file name of the associated encryption key to the whitelist.

18. The system of claim 17, wherein creating the second set of encryption key file names further comprises:
- detecting an error that occurred during the scanning;
- comparing the error to a list of known errors;
- determining, based on the comparing, whether the error is safe; and
- in an instance where the error is determined to be safe, continuing the scanning.

19. The system of claim 18, wherein the stages further comprise, in an instance where the error is not determined to be safe, stopping the scanning and not removing any encryption files from the computing device.

20. The system of claim 15, wherein the cutoff timestamp corresponds to the most recent boot of the computing device.

\* \* \* \* \*